Patented May 6, 1930

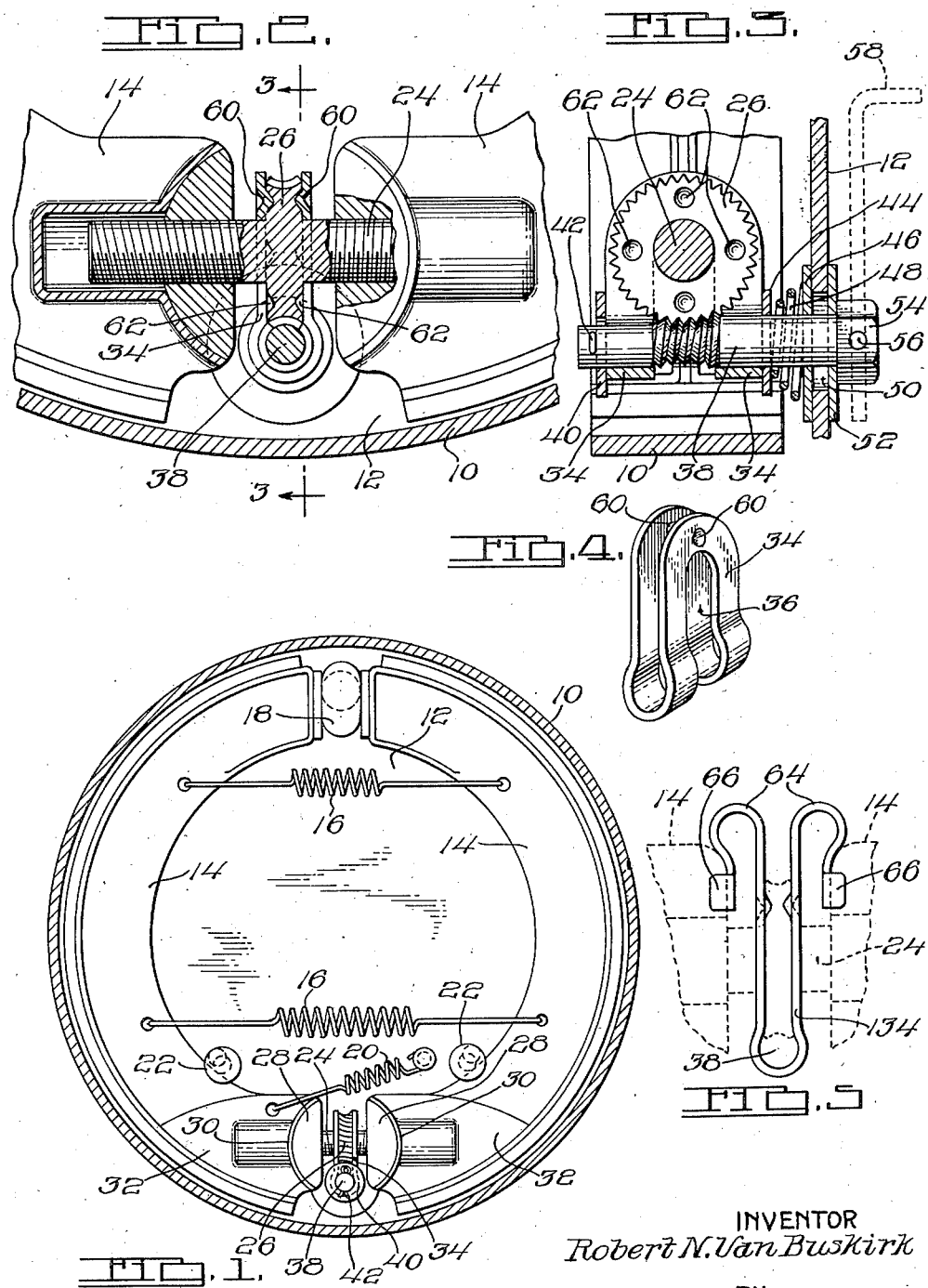

1,757,348

UNITED STATES PATENT OFFICE

ROBERT N. VAN BUSKIRK, OF DETROIT, MICHIGAN, ASSIGNOR TO BENDIX BRAKE COMPANY, OF SOUTH BEND, INDIANA, A CORPORATION OF ILLINOIS

BRAKE-ADJUSTING DEVICE

Application filed April 14, 1928. Serial No. 270,018.

This invention relates to adjustments for brakes and the like, and is illustrated as embodied in a novel floating adjustable expansion joint connecting the shoes of a brake of the type in which one shoe anchors when the drum is turning in one direction and the other shoe anchors when the drum is turning in the other direction.

Various features of novelty relate to providing an adjustment-operating device extending through the backing plate of the brake, and shown as geared to the adjustable connecting member; to providing a support for the operating device carried by the adjusting or connecting member so that the whole adjustment may float as a unit; and to the provision of simple means to lock the adjustment when made.

The above and other objects and features of the invention, including various novel and desirable structural details, will be apparent from the following description of the illustrative embodiments shown in the accompanying drawing, in which:

Figure 1 is a vertical section through the brake, just inside the head of the brake drum, and showing in side elevation the brake shoes and the novel adjustment;

Figure 2 is a view of the adjustment, on a larger scale than Figure 1, and partly in elevation and partly in central section;

Figure 3 is a section through the novel adjustment on the line 3—3 of Figure 2;

Figure 4 is a perspective view of the locking device which supports the laterally-extending operating member; and Figure 5 is a diagrammatic elevation of a modified adjustment.

The illustrated brake includes a rotatable drum 10, at the open side of which is a support such as a backing plate 12, and within which is the friction means of the brake. The friction means in this particular brake includes interchangeable shoes 14 connected by a novel floating adjustable expansion joint, and expanded against the resistance of springs 16 to apply the brake by means such as a cam 18. The braking torque may, if desired, be taken by cam 18, one shoe anchoring against the cam in one direction of drum rotation and the other shoe anchoring against the cam in the other direction of drum rotation. An auxiliary spring 20 urges one shoe against an adjustable eccentric stop 22 when the brake is released.

The novel adjustment includes a rotatable right-and-left threaded member 24 having an enlargement or collar 26 at its center, the collar being preferably in the form of a worm gear. Member 24 is threaded into two parts 28, generally hemispherical in form, which are seated in correspondingly-shaped recesses formed by flanges 30 on reinforcing plates 32 projection-welded to opposite sides of the webs of the shoes. Plates 30 are formed with half-sockets facing toward each other and affording spaces into which the ends of member 24 project.

A resilient looped device 34 of spring steel has a slot 36 through which the ends of member 24 project, so that device 34 is supported on and carried by member 24 with collar or gear 26 embraced by device 34. The bottom of device 34 is looped to form a pair of spaced supports in which are journaled an operating member such as a shaft 38 formed with a worm or gear meshing with the teeth of gear 26 between these spaced supports. Member 38 has at one end a washer 40 held by a cotter pin 42 and engaging device 34 in a manner to prevent endwise movement in one direction, and also has sleeved on its other end two washers 44 and 46 urged by a spring 48 apart against device 34 and backing plate 12 respectively.

Member 38 passes through a relatively large opening 50 in the backing plate, so that it may float freely with the above-described floating expansible joint. Opening 50 may be closed by a washer 52 held by a head 54 formed, if desired, with openings 56 for a suitable adjusting tool 58. It will be seen that turning the operating member 38 by means of the tool 58 will force parts 28 apart to make the adjustment.

To preserve the adjustment when made, device 34 may have pawls or teeth 60 depressed in its ends, for engagement with depressions or rack teeth 62 formed in the opposite sides of collar 26, thus normally locking member 24 against turning.

In Figure 5, the ends of the device 134 are looped around to form resilient portions 64 engaging the ends of shoes 14 and having ears 66 embracing the ends of the shoes.

While two illustrative embodiments have been described in detail, it is not my intention to limit the scope of the invention to those particular embodiments, or otherwise than by the terms of the appended claims.

I claim:

1. A brake comprising, in combination, a pair of friction members, an expansible floating joint including a threaded member adjustably connecting said members and a device extending laterally from said members and which floats with said joint and which is operable to turn said threaded member to make the adjustment.

2. A brake comprising, in combination, a pair of friction members, an expansible floating joint including a right-and-left threaded member adjustably connecting said friction members and a device extending laterally of said members and which is operable to turn said threaded member to make the adjustment.

3. A floating adjustable joint for a brake or the like comprising, in combination, a pair of floating threaded thrust parts, a right-and-left threaded member adjustably connecting said parts and floating with said parts and which has a central worm gear, and an operating worm meshing with said gear and extending substantially at right angles to said member and which floats with said member.

4. A floating adjustable joint for a brake or the like comprising, in combination, a pair of floating threaded thrust parts, a right-and-left threaded member adjustably connecting said parts and floating with said parts and which has a central worm gear, and an operating worm meshing with said gear and extending substantially at right angles to said member.

5. A brake comprising, in combination, a drum, friction means within the drum, a backing plate at the open side of the drum having a relatively large opening, an adjusting member floating with the friction means and extending through said opening and operable from outside the backing plate, and means inside of the drum operated by said member to adjust the friction means.

6. A brake comprising, in combination, a drum, friction means within the drum, a backing plate at the open side of the drum having a relatively large opening, a floating adjusting member extending through said opening and operable from outside the backing plate, and means inside of the drum operated by said member to adjust the friction means.

7. A brake comprising, in combination, a drum, friction means within the drum, a backing plate at the open side of the drum having a relatively large opening, a floating adjusting member extending through said opening and operable from outside the backing plate, and a floating device within the drum geared to said member and operated thereby to adjust the friction means.

8. A brake comprising, in combination, a drum, friction means within the drum, a backing plate at the open side of the drum having a relatively large opening, a floating adjusting member extending through said opening and operable from outside the backing plate, and a floating device within the drum geared to said member and operated thereby to adjust the friction means, together with means supported by said device and which supports said member.

9. A brake comprising, in combination, friction means having a floating adustment, a rotatable laterally-extending part rotatable to operate the adjustment, and means carried by the adjustment and in which said part is journaled.

10. An adjustment for a brake or the like comprising, in combination, a rotatable adjusting member, a looped device supported on said member, and an operating device for said member journaled in the looped portion of said device.

11. An adjustment for a brake or the like comprising, in combination, a rotatable adjusting member having a gear, a looped device supported on said member and embracing said gear, and an operating device for said member journaled in the looped portion of said device and having a part meshing with said gear.

12. An adjustment comprising, in combination, a rotatable member having a central operating portion, a resilient device supported by said member and embracing said portion, and an operating device supported by the resilient device and arranged to turn said member.

13. An adjustment comprising, in combination, a rotatable member having a central operating portion, a resilient device supported by said member and embracing said portion and yieldingly locking said portion normally against turning, and an operating device supported by the resilient device and arranged to turn said member.

14. An adjustment comprising, in combination, a rotatable member having a central operating portion, and a resilient device supported by said member and embracing said portion.

15. An adjustment comprising two operatively engaging members, in combination with a device supported by one member and supporting the other member and normally locking at least one of said members to prevent adjusting movement.

16. An adustment comprising two intermeshing gear members, in combination with a device supported by one member and in which the other member is journaled and which normally locks at least one of said members to prevent adjusting movement.

In testimony whereof I have hereunto signed my name.

ROBERT N. VAN BUSKIRK.